US008267123B2

(12) United States Patent
LeBlanc et al.

(10) Patent No.: US 8,267,123 B2
(45) Date of Patent: Sep. 18, 2012

(54) METHODS AND APPARATUS TO CHARGE ACCUMULATOR APPARATUS

(75) Inventors: William Kenneth LeBlanc, Mansfield, OH (US); Michael Patrick McQuade, Mansfield, OH (US)

(73) Assignee: Emerson Process Management, Valve Automation Inc., Waller, TX (US)

( * ) Notice: Subject to any disclaimer, the term of this patent is extended or adjusted under 35 U.S.C. 154(b) by 603 days.

(21) Appl. No.: 12/493,947

(22) Filed: Jun. 29, 2009

(65) Prior Publication Data

US 2010/0326063 A1 Dec. 30, 2010

(51) Int. Cl.
*F16L 55/04* (2006.01)

(52) U.S. Cl. .......... 138/31; 138/30

(58) Field of Classification Search .......... 138/31, 138/30
See application file for complete search history.

(56) References Cited

U.S. PATENT DOCUMENTS

| | | | | |
|---|---|---|---|---|
| 2,365,994 | A * | 12/1944 | Ashton | 138/31 |
| 2,747,370 | A | 5/1956 | Traut | 138/31 |
| 2,748,801 | A * | 6/1956 | McCuistion | 138/31 |
| 2,764,997 | A * | 10/1956 | McCuistion | 138/31 |
| RE24,382 | E * | 10/1957 | Greer | 138/31 |
| 2,873,763 | A * | 2/1959 | Mercier | 138/31 |
| 3,136,340 | A * | 6/1964 | Wildi et al. | 138/31 |
| 3,224,464 | A * | 12/1965 | Schmiel | 138/31 |
| 3,681,918 | A | 8/1972 | Chanin | 60/415 |
| 4,371,317 | A | 2/1983 | Heibel | 417/298 |
| 4,461,322 | A | 7/1984 | Mills | 138/31 |
| 5,024,250 | A | 6/1991 | Nakamura | 138/31 |
| 5,560,733 | A | 10/1996 | Dickinson | 404/6 |
| 5,767,660 | A | 6/1998 | Schmidt | 320/140 |
| 6,644,354 | B2 * | 11/2003 | Dinkel et al. | 138/30 |
| 7,121,304 | B2 | 10/2006 | Gray, Jr. | 138/30 |
| 7,234,491 | B2 | 6/2007 | Baltes et al. | 138/31 |
| 2006/0130920 | A1 | 6/2006 | Baltes | 138/31 |
| 2008/0060711 | A1 | 3/2008 | Kort | 138/31 |

FOREIGN PATENT DOCUMENTS

| | | |
|---|---|---|
| DE | 7044855 | 12/1971 |
| DE | 20113785 | 4/2002 |
| GB | 1020490 | 2/1966 |

OTHER PUBLICATIONS

International Searching Authority, "International Search Report," issued in connection with international application serial No. PCT/US2010/033761, mailed Sep. 6, 2010, 4 pages. International Searching Authority, "Written Opinion of the International Searching Authority," issued in connection with international application serial No. PCT/US2010/033761, mailed Sep. 6, 2010, 10 pages.
HYDAC, "Piston Accumulators SK Series," retrieved from www.hydacusa.com/accum/piston.htm on May 1, 2009, 3 pages.

* cited by examiner

*Primary Examiner* — Patrick F Brinson
(74) *Attorney, Agent, or Firm* — Hanley, Flight & Zimmerman, LLC

(57) ABSTRACT

Methods and apparatus to charge accumulators are described. An example system to charge an accumulator apparatus includes a piston disposed within a housing to define a first chamber adjacent a first side of the piston and a second chamber adjacent a second side of the piston. A fill probe having a body and a passageway between a first end of the fill probe and a second end of the fill probe removably couples to the piston to fluidly couple to the passageway of the fill probe to the second chamber of the housing when the accumulator is in a charging condition. A valve is fluidly coupled to the piston to enable fluid flow to the second chamber of the housing via the piston when the fill probe is coupled to the piston.

37 Claims, 9 Drawing Sheets

METHODS AND APPARATUS TO CHARGE ACCUMULATOR APPARATUS

FIELD OF THE DISCLOSURE

The present disclosure relates generally to accumulators and, more particularly, to methods and apparatus to charge accumulator apparatus.

BACKGROUND

Hydraulic power units such as, for example, accumulator apparatus, are often employed in hydraulic systems to provide, for example, energy storage, fluid compensation, energy accumulation, pulsation damping, etc. For example, when employed as energy storage units, accumulator apparatus may be used to provide pressurized control fluid (e.g., hydraulic oil) to equipment (e.g., hydraulic equipment) such as cylinders, valve actuators, or other machinery requiring high pressure fluid to operate. For example, an accumulator may be used to store pressurized hydraulic fluid provided by a hydraulic pump when the hydraulic system demand is low (e.g., a hydraulic actuator is not being actuated) and to supply the previously stored pressurized hydraulic fluid to the system to provide additional energy when the demand of the hydraulic system increases (e.g., the hydraulic actuator is being actuated).

Accumulator apparatus such as, for example, hydraulic accumulator apparatus typically include a housing or cylinder having two chambers separated by a piston. A first chamber may be fluidly coupled to a hydraulic system to receive pressurized hydraulic fluid. A second chamber is typically filled or pre-charged or, more generally, charged with an inert gas such as, for example, a dry nitrogen gas. A seal surrounds the piston to prevent leakage of the hydraulic fluid and/or the inert gas across the piston between the first and second chambers.

In operation, pressurized hydraulic fluid is stored in the first chamber via a pump. The hydraulic fluid acts on a first side of the piston via the first chamber to cause the piston to move toward the second chamber to a stored position. As the piston moves toward the stored position, the volume of the second chamber is reduced, thereby compressing the gas in the second chamber. As a result, the pressure of the gas in the second chamber increases until a force exerted on the first side of the piston by the pressure of the hydraulic fluid in the first chamber is substantially equal to a force exerted on a second side of the piston by the pressure of the compressed gas in the second chamber. During operation, accumulators can remain in the stored position for a relatively long period of time. Thus, the gas in the second chamber may be subjected to high pressure levels for a relatively long period of time.

When the demand of the hydraulic system increases, the pressure of the hydraulic fluid in the first chamber decreases. When the pressure of the hydraulic fluid decreases below the pressure of the compressed gas, the gas expands and drives the piston toward the first chamber and exerts a force on the hydraulic fluid via the piston. As a result, the accumulator apparatus supplies the hydraulic system with previously stored pressurized hydraulic fluid. The pre-charged pressure of the gas in the second chamber determines the minimum system pressure provided by the accumulator apparatus.

Some known accumulator apparatus have a housing that includes a pre-charge port or connection (e.g., a threaded port, a threaded connector) fluidly coupled to the second chamber to pre-charge or charge the accumulator apparatus. An inert gas such as a dry nitrogen gas may be supplied from a tank or vessel to the second chamber via the pre-charge port or connection. However, the gas may leak slowly from the second chamber to the environment via the pre-charge port or connection. For example, pre-charge ports or connections of some known accumulator apparatus exposed to relatively high vibration environments may loosen and cause leakage of the gas. Such leakage typically occurs when the piston is at the stored position because the pressure of the gas is relatively high in this position. Leakage of gas from the second chamber reduces the operating pressures of the system and may substantially impair the ability of the accumulator to provide hydraulic fluid at a desired pressure to the hydraulic system when the demand of the hydraulic system increases.

Furthermore, in some applications, process systems may be located in remote locations such as, for example, off-shore drilling wells, mining operations, oil fields, etc. Such remote locations make it difficult and costly to access accumulator apparatus for maintenance and/or to re-charge the accumulator apparatus with a gas. Also, having to charge accumulator apparatus with a fluid significantly increases maintenance costs.

SUMMARY

In one example, an example system to charge an accumulator apparatus includes a piston disposed within a housing to define a first chamber adjacent a first side of the piston and a second chamber adjacent a second side of the piston. A fill probe having a body and a passageway between a first end of the fill probe and a second end of the fill probe removably couples to the piston to fluidly couple to the passageway of the fill probe to the second chamber of the housing when the accumulator is in a charging condition. A valve is fluidly coupled to the piston to enable fluid flow to the second chamber of the housing via the piston when the fill probe is coupled to the piston.

In another example, an example method to charge an accumulator apparatus includes removing a plug from a first bore adjacent a first side of a piston disposed within a housing of the accumulator apparatus. The method includes coupling a first portion of a fill probe to the first bore to engage a valve fluidly coupled to the piston to enable fluid flow through the piston when the accumulator apparatus is in a charging condition. The method further includes fluidly coupling a second portion of the fill probe to a fluid supply source to enable a first pressurized fluid from the fluid supply source to flow to a first chamber adjacent a second side of the piston via the fill probe and the valve.

In yet another example, an example system to charge an accumulator apparatus includes first means for fluidly coupling a first chamber of an accumulator housing and a gas supply source such that the first means for fluidly coupling is to be coupled to a first side of a piston disposed within the housing adjacent a second chamber when the accumulator apparatus is in a charging condition. A second side of the piston, an end cap, and the housing define the first chamber. The system also includes second means for fluidly coupling the first chamber and the first means for fluidly coupling via the piston when the first means for fluidly coupling is coupled to the first side of the piston.

In yet another example, an example accumulator apparatus includes a piston disposed within a housing to at least partially define a first chamber adjacent a first side of the piston and a second chamber adjacent a second side of the piston. A valve is fluidly coupled to the piston and moves between an open position to enable fluid flow through the piston when the accumulator apparatus is in a charging condition and a closed position to prevent fluid flow through the piston when the accumulator apparatus is not in the charging condition. A plug is removably coupled to the piston between the valve and the first chamber of the housing.

DETAILED DESCRIPTION

Figure 1:
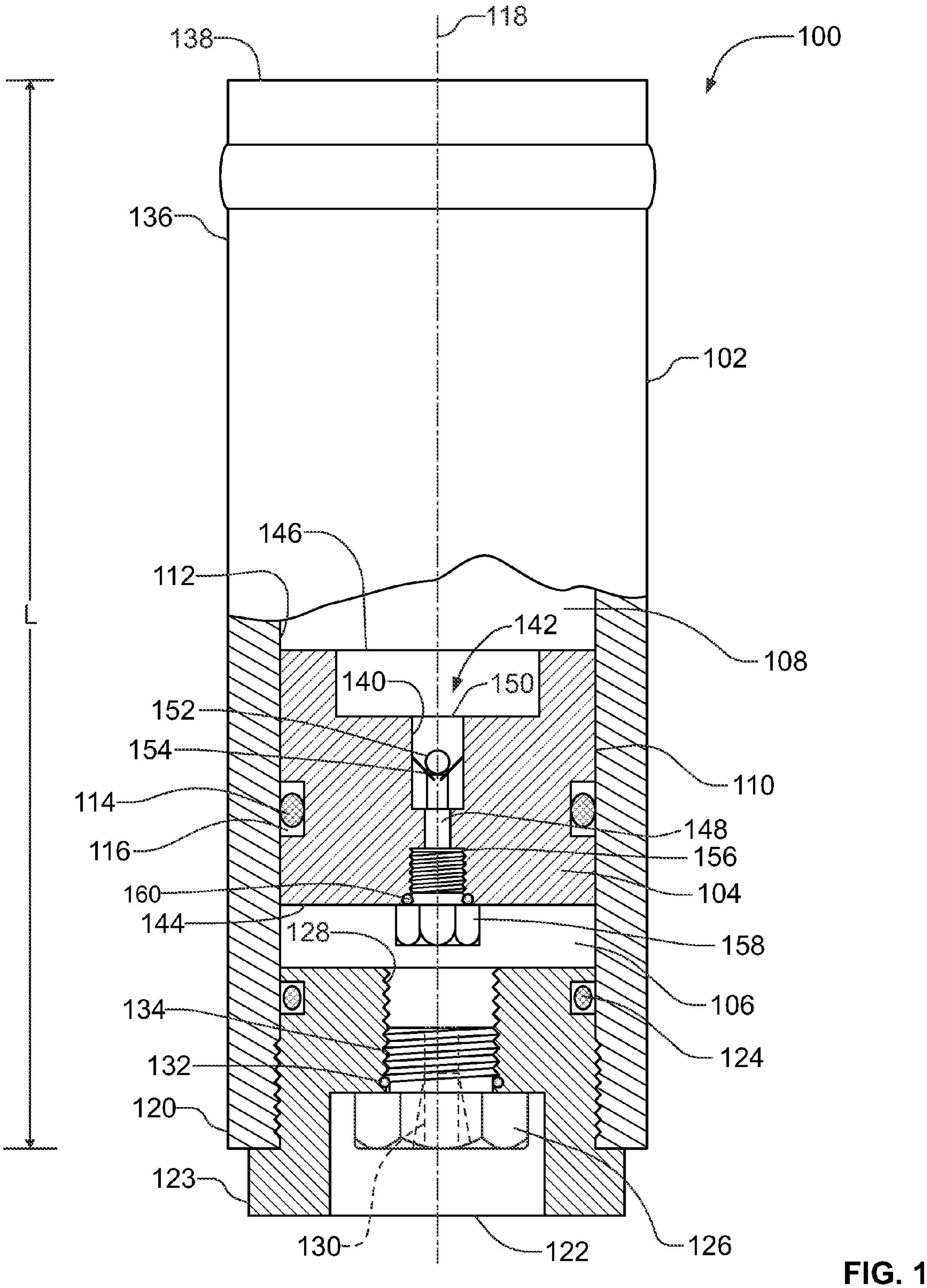
FIG. 1 illustrates an example accumulator apparatus described herein.

Hydraulic power units such as, for example, hydraulic accumulator apparatus that utilize a compressible fluid to store energy are typically filled, pre-charged, or charged with an inert gas such as dry nitrogen. The example accumulator apparatus described herein may be used with fluid powered systems to provide energy storage, fluid compensation, energy accumulation, pulsation damping, etc. The example accumulator apparatus described herein may be fluidly coupled to a fluid powered system such as a hydraulic fluid system to prevent a rapid decrease in fluid pressure when the demand of the hydraulic system increases. The fluid powered system may provide pressurized hydraulic fluid to operate or actuate a control device such as a hydraulic actuator downstream from the example accumulator apparatus described herein.

A hydraulic fluid system may include a pump upstream from the accumulator apparatus to provide pressurized hydraulic fluid to the example accumulator apparatus when the demand of the hydraulic fluid system is low. In other words, the example accumulator apparatus may be used to accumulate energy by storing pressurized hydraulic fluid when the output capacity of the pump exceeds the demand of the hydraulic system. The accumulator apparatus can provide or release the accumulated energy as a quantity of the pressurized fluid in response to an increased demand of the hydraulic system. Thus, the example accumulator apparatus described herein may be used to supplement a hydraulic fluid pump by providing pressurized hydraulic fluid at a relatively greater flow rate than can be supplied by the pump alone when the demand of the hydraulic system increases. Additionally, if the hydraulic pump fails due to, for example, a power outage, the example accumulator apparatus can provide an auxiliary fluid source to maintain a minimum pressure (e.g., as determined by a pre-charge pressure of the gas in the accumulator) of a hydraulic fluid in a hydraulic fluid system.

The example methods and apparatus described herein substantially reduce or prevent leakage of a pressurized fluid (e.g., an inert gas) from an accumulator to the atmosphere. Further, in contrast to conventional or known accumulator pre-charging or charging methods and apparatus, the example accumulator apparatus described herein is configured to enable an accumulator charging system to couple to an internal gas storage chamber of the accumulator via a piston of the accumulator. Thus, in contrast to known accumulator apparatus, the example accumulator apparatus described herein do not require an ancillary port or connector (e.g., a threaded coupling) coupled to the accumulator housing to fluidly couple a gas storage chamber of the accumulator apparatus to a gas supply source such as a tank. Instead, the example accumulator apparatus described herein employ a fill probe that removably couples to the piston of the accumulator apparatus to charge the gas storage chamber of the accumulator apparatus with a pressurized fluid such as a dry nitrogen gas.

As described in greater detail below, an example accumulator apparatus includes a housing having a piston disposed therein to define a first or fluid chamber (e.g., a hydraulic fluid) and a second or gas storage chamber. The first chamber is to receive, for example, an incompressible fluid, such as a hydraulic fluid or oil, via a fluid port coupled to the accumulator housing. The second chamber may be pre-charged or charged with a compressible fluid such as an inert gas via a passageway of flow path through the piston and the hydraulic fluid port.

As noted above, in contrast to some known accumulators having a port or connection to fluidly couple a gas chamber of the accumulator to a gas supply source, the examples described herein use a fill probe to fluidly couple the gas supply source and the gas chamber of the housing via the hydraulic port and the piston. This configuration enables a second end of an example accumulator housing described herein to include an end cap that is fixed to (e.g., via welding) or integrally formed with the accumulator housing. In this manner, the end cap, the piston and the housing provide a remarkably tighter seal to contain the gas within the gas storage chamber than possible with the above-noted known accumulator apparatus. Thus, the end cap provides a seal to prevent or substantially reduce leakage of gas from the gas storage chamber and the atmosphere.

FIG. 1 illustrates an example accumulator apparatus 100 described herein. As shown in this example, the example accumulator apparatus 100 includes a housing 102 (e.g., a cylindrical body or cylinder) having a length L. A piston 104 is disposed within the housing 102 and defines a first chamber or a fluid side 106 of the accumulator apparatus 100 and a second chamber (i.e., a gas storage chamber) or a gas side 108 of the accumulator apparatus 100. The first chamber 106 may receive an incompressible fluid and the second chamber 108 may receive a compressible fluid. In this example, the first chamber 106 is to receive a hydraulic fluid (e.g., hydraulic oil) and the second chamber 108 is to receive a pressurized gas (e.g., an inert gas).

The piston 104 has a cylindrical body 110 that is sized to fit closely within a bore 112 of the housing 102. A seal 114 (e.g., a T-seal) is disposed within a gland 116 (e.g., formed on the periphery of the body 110) of the piston 104 to provide a tight seal and prevent unwanted leakage of fluid and/or gas across the piston 104 between the first and second chambers 106 and 108. The piston 104 moves in a rectilinear manner along a longitudinal axis 118 between a first position at which the second chamber 108 has a maximum volume and a second position (e.g., a stored position) at which the second chamber 108 has a minimum volume.

In the illustrated example, a first end 120 of the housing 102 receives a port or connection 122 (e.g., a hydraulic port) depicted as an end cap 123 that removably couples (e.g., threadably couples) to the first end 120 of the housing 102. In this example, the port 122 is adjacent the first chamber 106 and fluidly couples the first chamber 106 to a fluid powered system such as, for example, a hydraulic system or component. In this example, the end cap 123 includes a seal 124 (e.g., an O-ring) to provide a tight seal between the first chamber 106 and the housing 102.

As depicted in FIG. 1, the end cap 123 includes a cap screw 126 that threadably couples to a threaded bore 128 of the end cap 123. The cap screw 126 includes an opening 130 to provide a fluid flow passage between a hydraulic system and the first chamber 106 of the housing 102 when the port 122 is fluidly coupled to the hydraulic system. In other examples, the end cap 123 may be coupled to the housing 102 via any other suitable fastening mechanism(s). As shown, the cap screw 126 includes a seal 132 (e.g., an O-ring) to provide a tight seal between an outer surface 134 of the cap screw 126 and the end cap 123 to prevent fluid leakage between the first chamber 106 and the environment via the bore 128.

In this example, a second end 136 of the housing 102 includes an end cap 138 that is coupled or fixed to the housing 102 via, for example, welding. However, in other examples, the end cap 138 may be integrally formed with the housing 102 as a unitary piece or structure. The end cap 138 (e.g., via a welded joint) provides a tight seal to prevent leakage of pressurized gas between the second chamber 108 and the environment. In general, the end cap 138, the piston 104 and the housing 102 provide a substantially tight seal to contain a pressurized fluid (e.g., a pressurized gas) in the second chamber 108 and prevent leakage of the pressurized gas to the atmosphere.

In the illustrated example, as described in greater detail below in connection with FIGS. 2-7, the example piston 104 includes an opening or aperture 140 having a valve 142 coupled to the piston 104 to enable fluid (e.g., gas) to flow to the second chamber 108 when the accumulator apparatus 100 is being charged with pressurized fluid. In other words, the valve 142, which may be implemented with a check valve, enables fluid flow between a first side 144 of the piston 104 and a second side 146 of the piston 104 when the accumulator apparatus 100 is being charged with gas. The valve 142 has a first end or inlet 148 adjacent the first chamber 106 or the first side 144 of the piston 104 and a second end or outlet 150 adjacent the second chamber 108 or the second side 146 of the piston 104.

In this example, the valve 142 includes a poppet 152 (e.g., a ball) disposed between the inlet 148 and the outlet 150. The poppet 152 is biased (e.g., via a biasing element) toward a valve seat 154 when the accumulator apparatus 100 is in operation, and moves away from the valve seat 154 to allow fluid flow between the inlet 148 and the outlet 150 when the accumulator apparatus 100 is being charged with gas. For example, the poppet 152 is biased to sealingly engage the valve seat 154 when a pre-charge or charging system is not coupled to the accumulator apparatus 100 (e.g. when the accumulator is in operation) to prevent fluid flow between the inlet 148 and the outlet 150. In other examples, the valve 142 may be any other suitable valve to allow fluid flow through the piston 104 during charging and prevent fluid flow through the piston 104 when the accumulator apparatus 100 is not in a charging condition as shown in FIG. 1.

Additionally, in this example, the piston includes a threaded bore 156 adjacent the inlet 148 of the valve 142 or the first side 144 of the piston 104 and coaxially aligned with the opening 140 of the piston 104. A plug 158 removably couples to the bore 156 to further prevent fluid and/or gas flow between the first and second chambers 106 and 108 via the valve 142 when the accumulator apparatus 100 is not in a charging condition (FIG. 1). The plug 158 may include a seal 160 (e.g., an O-ring) to provide a tight seal to further prevent fluid and/or gas flow between the first and second chambers 106 and 108 via the valve 142 when the plug 158 is coupled to the bore 156.

In operation, in this example, the accumulator apparatus 100 provides pressurized hydraulic fluid to a hydraulic fluid system such as, for example, a hydraulic actuator downstream from the accumulator apparatus 100. A pump, for example, upstream of the accumulator apparatus 100 provides pressurized hydraulic fluid to the first chamber 106 via the port 122. In some examples, pressurized hydraulic fluid is received by the first chamber 106 via the port 122 when the pressure of the hydraulic fluid increases due to a decrease in demand of the hydraulic fluid system.

In the first chamber 106, the hydraulic fluid exerts a force on the first side 144 of the piston 104. A force exerted by the pressurized hydraulic fluid on the first side 144 of the piston 104 that is greater than a force exerted on the second side 146 of the piston 104 by a gas in the second chamber 108 causes the piston 104 to move toward the second chamber 108. As a result, the volume of the second chamber 108 decreases and causes the gas in the second chamber to be compressed. At the same time, the volume of the first chamber 106 increases as the first chamber 106 accumulates a greater volume of pressurized hydraulic fluid. As the volume of the second chamber is reduced, the pressure of the gas in the second chamber 108 increases, thereby increasing a force exerted on the second side 146 of the piston 104 by the gas in the second chamber 108. The pressure of the gas in the second chamber 108 increases to a maximum pressure that is substantially equal to a maximum pressure of the hydraulic fluid in the first chamber 106.

As noted above, as the demand of the hydraulic system increases, the pressure of the hydraulic system decreases. When the pressure of the hydraulic fluid in the first chamber 106 exerts a force on the first side 144 of the piston 104 that is less than the force exerted on the second side 146 of the piston 104 by the compressed gas in the second chamber 108, the pressurized gas in the second chamber 108 expands and causes the piston 104 to move in a second direction toward the first chamber 106. As a result, the piston 104 supplies the pressurized hydraulic fluid in the first chamber 106 to the hydraulic system via the port 122. Thus, the example accumulator apparatus 100 may be used to store and then provide pressurized hydraulic fluid to the hydraulic system when the demand of the hydraulic system increases.

Figure 2:
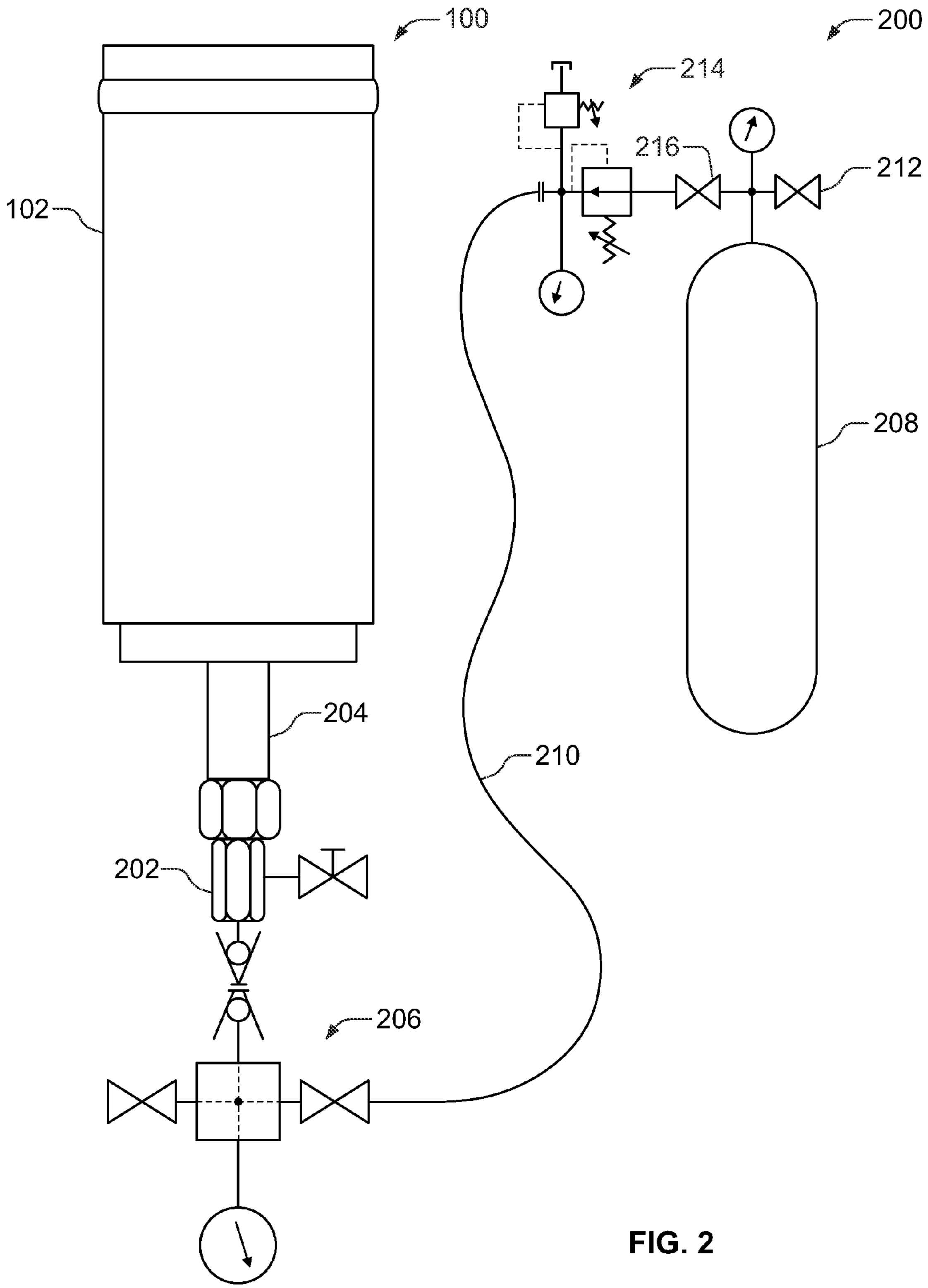
FIG. 2 illustrates an example pre-charge or charging system operatively coupled to the example accumulator apparatus of FIG. 1.

FIG. 2 illustrates the example accumulator apparatus 100 of FIG. 1 being charged with pressurized gas. Referring to FIG. 2, to charge the accumulator apparatus 100 of FIG. 1 (i.e., to fill the second chamber 108 with a gas), the example accumulator apparatus 100 may be coupled to a charging system 200. In the illustrated example, the charging system 200 includes a fill probe 202, a safety collar 204, a manifold assembly 206, and a gas supply source 208 (e.g., a gas bottle, a tank). The charging system 200 may be used to pre-charge or charge the accumulator apparatus 100 with, for example, a dry nitrogen gas.

To charge the accumulator apparatus 100, hydraulic fluid is removed from the first chamber 106 so that the piston 104 is at the first position (i.e., the second chamber 108 has a maximum volume). In this manner, because the gas is at a minimum pressure when the second chamber has a maximum volume (i.e., when the piston is at the first position), a minimum desired hydraulic system pressure to be provided by the accumulator apparatus 100 can be set or pre-determined. In other words, the minimum gas pressure in the second chamber 108 may be used to set or determine the minimum hydraulic system pressure.

As described in greater detail below, after the hydraulic fluid is removed from the first chamber 106, the fill probe 202 and then the safety collar 204 are removably coupled to the accumulator apparatus 100. Tubing 210 (e.g., a hose) fluidly couples the gas supply source 208 to the second chamber 108 of the accumulator apparatus 100 via the manifold assembly 206 and the fill probe 202. A relief valve 212 and/or a regulator 214 are disposed between the gas supply source 208 and the manifold assembly 206 to regulate or adjust the pre-determined or desired pre-charge or charging pressure of the gas (i.e., the minimum desired pressure of the hydraulic system) from the gas supply source 208. A valve 216 is moved between an open position and a closed position to allow and/or prevent gas flow from the gas supply source 208 to the regulator 214.

Figure 3:
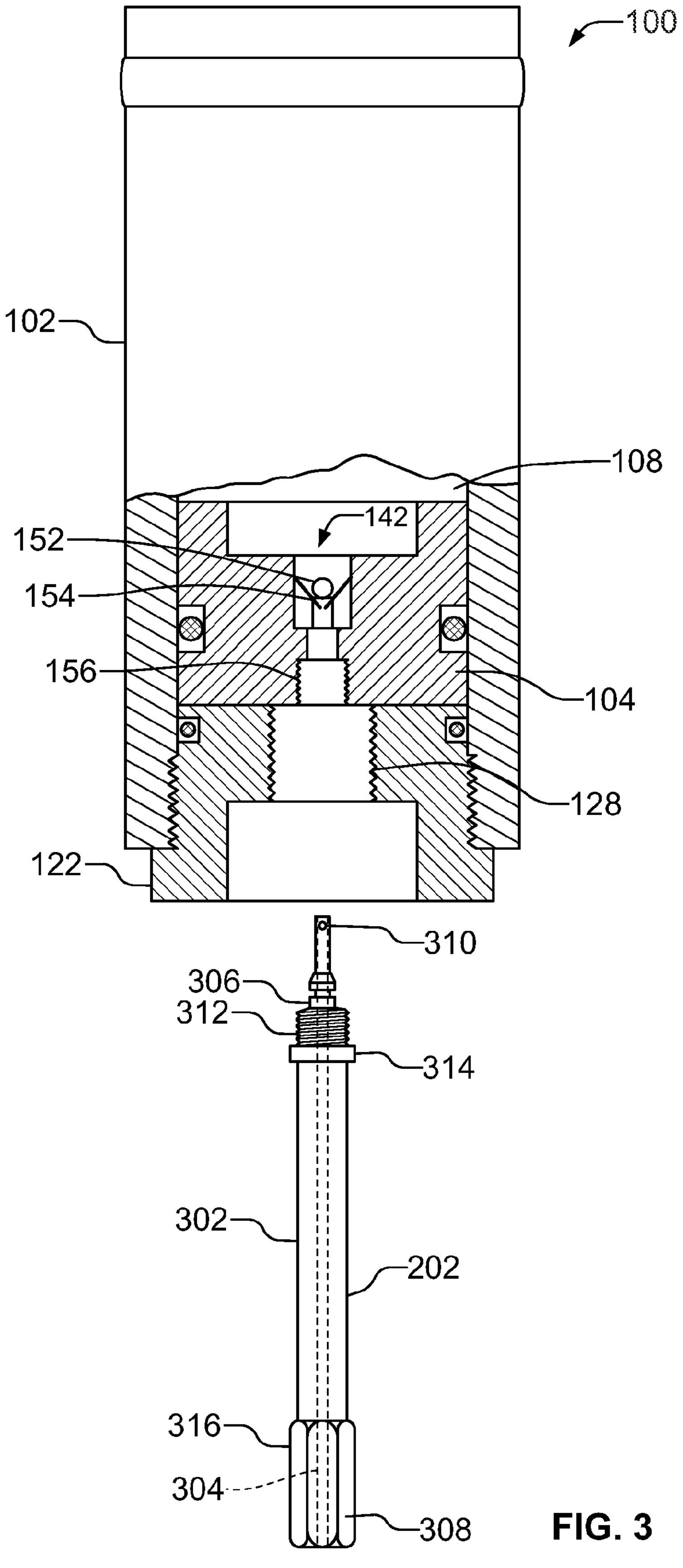
FIG. 3 illustrates the example accumulator apparatus of FIGS. 1 and 2 and an example fill probe of the example system of FIG. 2.

Referring also to FIG. 3, the fill probe 202 removably couples (e.g., threadably couples) to the piston 104 to fluidly couple the gas supply source 208 to the second chamber 108. In this example, the fill probe 202 includes a cylindrical body 302 having a passage or aperture 304 to fluidly couple a first end 306 of the body 302 and a second end 308 of the body 302. The first end 306 includes a tip or probe 310 and a threaded portion 312. In this example, the threaded portion 312 threadably couples to the bore 156 of the piston 104. As shown, the body 302 of the fill probe 202 includes a collar or protruding lip 314 adjacent the threaded portion 312 of the body 302. As depicted in this example, the second end 308 includes a hex-shaped portion 316 to receive, for example, a tool to couple and/or remove (e.g., thread and/or unthread) the fill probe 202 to and/or from the bore 156 of the piston 104.

Figure 4:
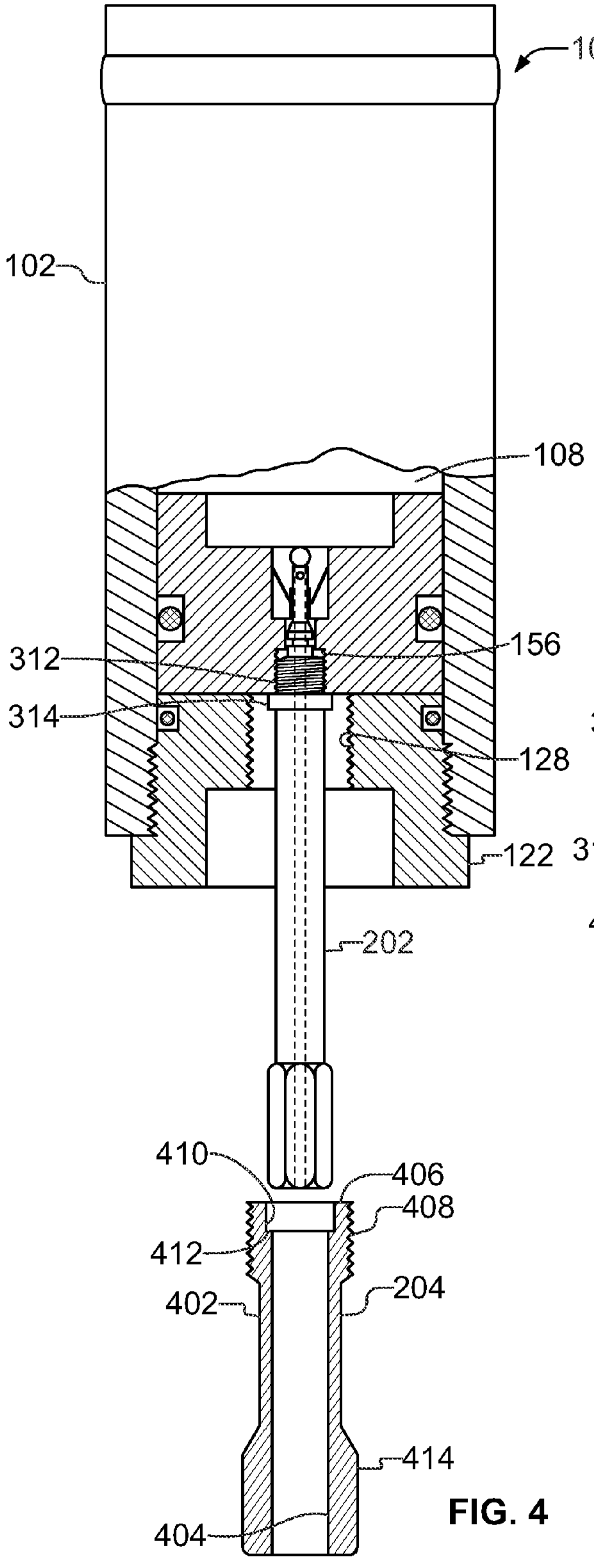
FIG. 4 illustrates the example fill probe of FIG. 3 coupled to the accumulator apparatus of FIGS. 1-3 and illustrates a safety collar of the example system of FIG. 2.

FIG. 4 illustrates the example accumulator apparatus 100 of FIGS. 1-3 and the example safety collar 204. Referring also to FIG. 4, in this example, the safety collar 204 includes a body 402 having an opening or aperture 404 through which the body 302 of the fill probe 202 extends when the fill probe 202 is coupled to the piston 104 as shown in FIG. 4. In this example, a first end 406 of the safety collar 204 includes a threaded portion 408 to threadably couple the safety collar 204 to the bore 128 of the end cap 123. The first end 406 also includes a recessed bore 410 to form a shoulder 412 that is sized and/or shaped to engage the collar 314 of the fill probe 202 to prevent inadvertent removal of the fill probe 202 from the piston 104 and/or the housing 102 of the accumulator apparatus 100 during charging operations. In this example, a second end 414 of the safety collar 204 is hex-shaped to receive, for example, a tool to couple and/or remove (e.g., thread and/or unthread) the safety collar 204 to and/or from the housing 102.

Figure 5:
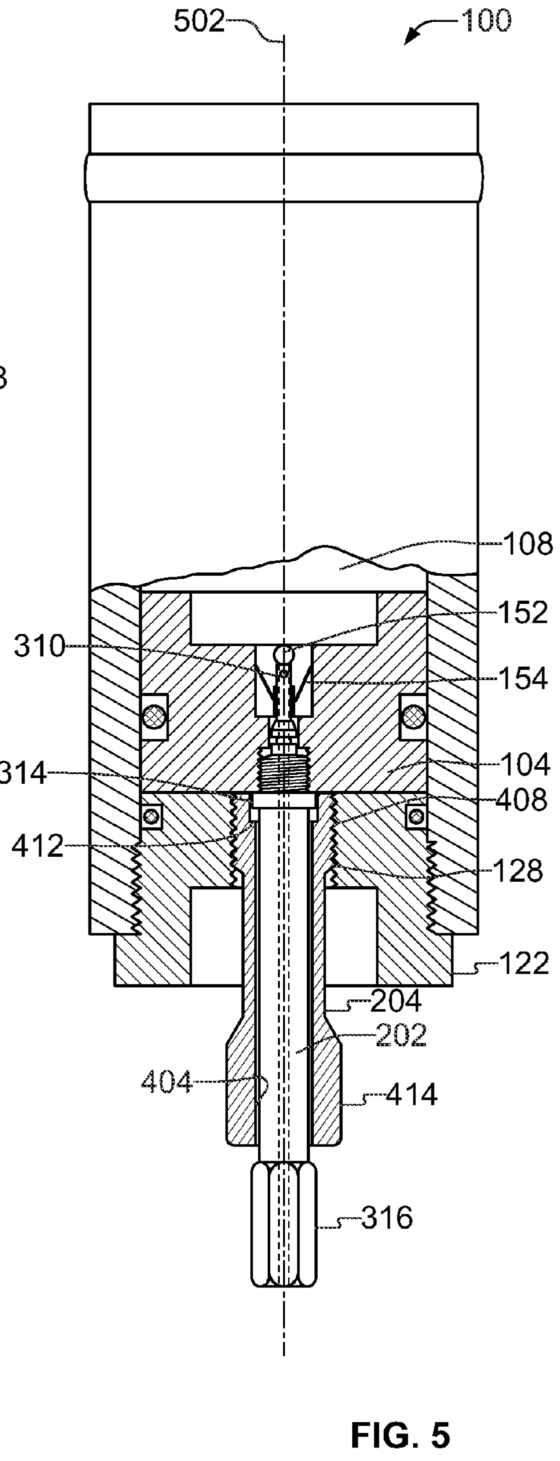
FIG. 5 illustrates the example fill probe of FIG. 3 and the example safety collar of FIG. 4 coupled to the accumulator apparatus of FIGS. 1-4.

FIG. 5 illustrates the fill probe 202 and the safety collar 204 coupled to the accumulator apparatus 100 of FIGS. 1-4. As noted above, the piston 104 includes the valve 142 to enable gas flow through the piston 104 when the fill probe 202 is coupled to the piston 104. As shown in FIG. 5, the tip 310 of the fill probe 202 engages the poppet 152 to move (e.g., unseat) the poppet 152 away from the valve seat 154 when the fill probe 202 is coupled to the piston 104. The safety collar 204 couples to the bore 128 of the end cap 123 via the threaded portion 408. When the fill probe 202 is coupled to the piston 104 during a charging operation, the fill probe 202 extends through the opening 404 of the safety collar 202. Additionally, during a charging operation, the collar 314 of the fill probe 202 is spaced away from and does not engage the shoulder 412 of the safety collar 204. The opening 404 of the safety collar 204 is sized to enable the fill probe 202 to rotate (e.g., in a clockwise and/or counter-clockwise direction about an axis 502) relative to the safety collar 204. Likewise, the safety collar 204 can rotate (e.g., in a clockwise and/or counter-clockwise direction about the axis 502) relative to the fill probe 202. As noted above, the fill probe 202 and/or the safety collar 204 may be coupled to the accumulator apparatus 100 via, for example, a tool (e.g., a wrench) that engages the respective second ends 308 and 414 of the fill probe 202 and the safety collar 204.

Figure 6:
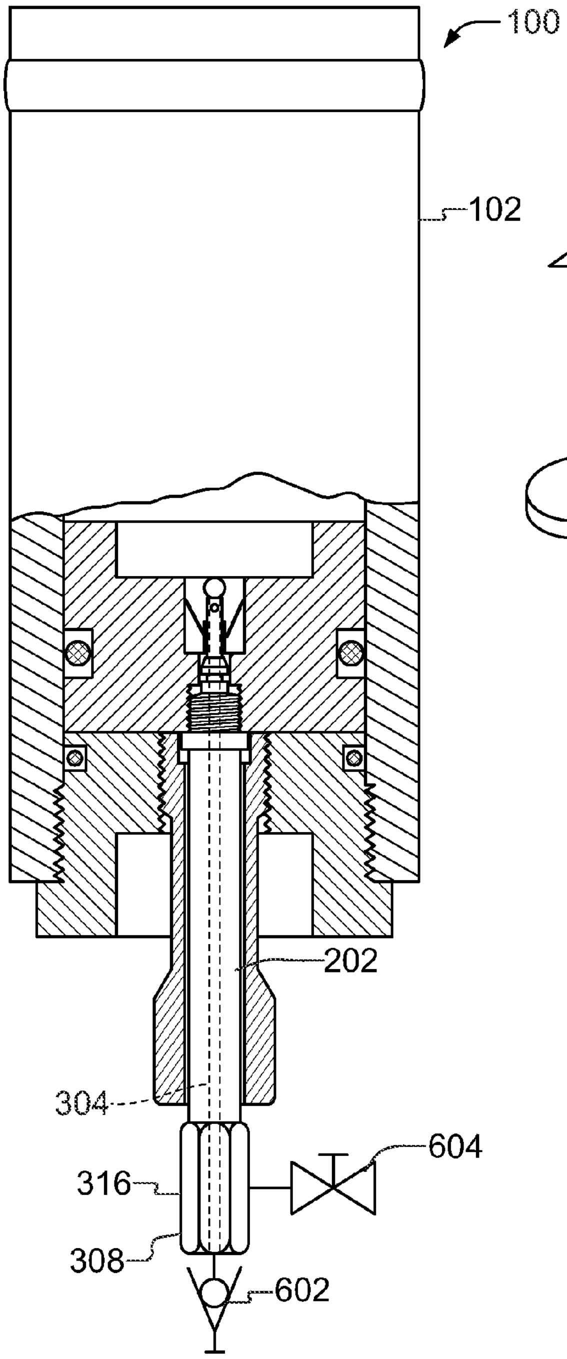
FIG. 6 illustrates a bleed valve and a coupling member coupled to the example fill probe of FIGS. 2-5.

Referring also to FIG. 6, in the illustrated example, a coupling member 602 such as, for example, a quick disconnect coupling member is coupled (e.g., threadably coupled) to the second end 308 of the fill probe 202. The coupling member 602 fluidly couples the manifold assembly 206 to the passage 304 of the fill probe 202. Also, as shown in this example, the second end 308 of the fill probe 202 is fluidly coupled to a bleed valve 604. As described in greater detail below, the bleed valve 604 allows residual gas that may be trapped in the passage 304 of the fill probe 202 to vent to the atmosphere after removing the fill probe 202 from the piston 104 when charging is complete.

Figure 7:
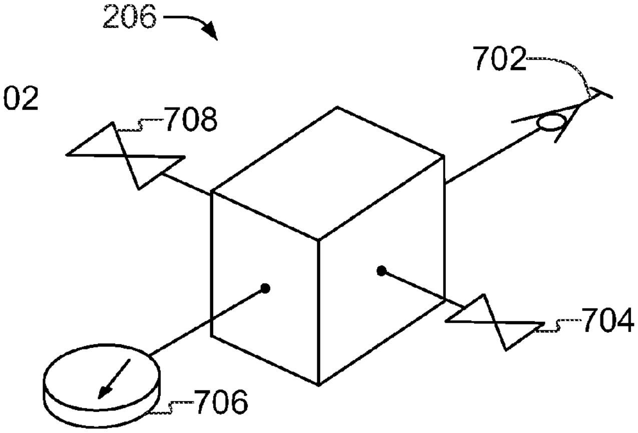
FIG. 7 illustrates an example manifold assembly that may be used to fluidly couple a tank to the example fill probe of FIGS. 2-6.

FIG. 7 illustrates a schematic illustration of the example manifold assembly 206. Referring to FIG. 7, the manifold assembly 206 includes a coupling member 702, a block valve 704, a gauge 706, and a bleed valve 708. The coupling member 702 (e.g., a quick disconnect coupling member) fluidly couples to the coupling member 602 of the fill probe 202 to fluidly couple the manifold assembly 206 to the fill probe 202. The block valve 704 fluidly couples the gas supply source 208 to the manifold assembly 206 via the tubing 210. The gauge 706 may be used to measure, for example, the pressure of the gas in the second chamber 108 during charging to determine if the pressure of the gas in the second chamber 108 is at a desired pressure (e.g., a pre-charge pressure). In other examples, the manifold assembly 206 may include only the coupling member 702, the block valve 704, the gauge 706, or the bleed valve 708, or any combination thereof. In yet other examples, an end of the tubing 210 may include a coupling member (e.g., a quick disconnect coupling member) to fluidly couple the gas supply source 208 to the coupling member 602 of the fill probe 202 and, thus, the second chamber 108 of the accumulator apparatus 100.

Referring to FIGS. 1-7, in this example, to charge the accumulator apparatus 100 with a pressurized gas, hydraulic fluid is removed from the first chamber 106 so that the piston 104 is in the first position and the second chamber 108 has a maximum volume. The cap screw 126 (FIG. 1) and the plug 158 (FIG. 1) are removed from their respective bores 128 and 156. The threaded portion 312 of the fill probe 202 is threadably coupled to the piston 104 via the bore 156 and the bleed valve 604 is moved to a closed position. As noted above, when the fill probe 202 is coupled to the piston 104 via the bore 156, the tip 310 of the fill probe 202 moves the poppet 152 away from the valve seat 154. This allows pressurized gas to flow through the piston 104 and into the second chamber 108.

The safety collar 204 is then coupled to the accumulator apparatus 100 as shown in FIGS. 2, 5 and 6. The manifold assembly 206 is coupled to the second end 308 of the fill probe 202 via the coupling members 602 and 702 and the block valve 704 and the bleed valve 708 of the manifold assembly 206 are moved to their closed positions. The gas supply source 208 is then fluidly coupled to the manifold assembly 206 via the block valve 704 and the tubing 210.

The regulator 214 is adjusted to regulate the pressure of the gas flowing from the gas supply source 208 to a desired or predetermined pressure such as a pre-charge pressure. In other words, the regulator 214 may be used to regulate the pressure of the gas from the gas supply source 208 so that the gas flowing to the second chamber 108 has a pressure to provide a desired or predetermined minimum hydraulic system pressure. For example, the regulator 214 may be adjusted to provide a pressurized gas having 1000 psi to provide a minimum system pressure of 1000 psi when the piston 104 is in the first position. Thus, in operation, to move the piston 104 to the second position, hydraulic fluid in the first chamber 106 must have a pressure that is greater than 1000 psi. In this example, to achieve a desired minimum operating system pressure, the accumulator apparatus 100 is charged without hydraulic fluid in the first chamber 106 (i.e., the piston 104 is at the first position).

When the regulator 214 is adjusted to provide the desired pre-charge pressure, the block valve 704 and the valve 216 are moved to open positions to allow gas flow from the gas supply source 208 to the manifold assembly 206. The regulated, pressurized gas from the regulator 214 flows through the manifold assembly 206 and to the second chamber 108 via the passage 304 of the fill probe 202 and the valve 142. In this configuration, the regulated, pressurized gas flows to the second chamber 108 via the valve 142 of the piston 104 because the tip 310 of the fill probe 202 has moved the poppet 152 away from the valve seat 154. The second chamber 108 is filled with the pressurized gas until a desired pressure in the second chamber 108 is achieved. In this example, an operator can determine when the pressure of the pressurized gas in the second chamber 108 reaches a desired pressure via the gauge 706 of the manifold assembly 206.

After the desired pressure is achieved, the block valve 704 may be moved to a closed position to prevent further gas flow from the gas supply source 208 to the fill probe 202. The valve 216 may be moved to a closed position to prevent gas flow from the gas supply source 208 to the manifold assembly 206. The bleed valve 708 may be moved to an open position to vent any gas trapped between the valve 216 and the manifold assembly 206. The manifold assembly 206 may then be removed from the fill probe 202 via the couplings 602 and 702.

The fill probe 202 may be removed (e.g., unthreaded) from the bore 156 of the piston 104 via, for example, a tool (e.g., a socket wrench). The fill probe 202 is removed from the piston 104 until the collar 314 of the fill probe 202 engages the shoulder 412 of the safety collar 204. When the collar 314 of the fill probe 202 engages the shoulder 412 of the safety collar 204, the tip 310 of the fill probe 202 moves away (e.g., in an axial direction away) from the piston 104 (e.g., in a downward direction in the orientation of FIG. 5) to release the poppet 152 of the valve 142. When the fill probe 202 is removed from the bore 156, the poppet 152 moves into sealing engagement with or seats against the valve seat 154 to prevent gas flow between the second chamber 108 and the first chamber 106.

The bleed valve 604 coupled to the second end 308 of the fill probe 202 is then moved to an open position to allow any residual gas that may be trapped within the passage 304 of the fill probe 202 to vent or bleed to the atmosphere. After the fill probe 202 is vented, the safety collar 204 and the fill probe 202 are removed from the housing 102. Then, the plug 158 is coupled to the bore 156 and the cap screw 126 is coupled to the bore 128.

In contrast to some known accumulator apparatus, the example accumulator apparatus 100 does include conduit connections, fittings, tubing, gauge ports, isolation fill valves, etc., coupled (e.g., threadably coupled) to the housing 102 to charge the second chamber 108 of the accumulator apparatus 100. Instead, the second chamber 108 of the example accumulator apparatus 100 is substantially sealed. In this manner, the accumulator apparatus 100 substantially reduces or prevents unwanted leakage of gas in the second chamber 108 to the atmosphere. The accumulator apparatus 100 sealingly contains the gas in the second chamber 108 of the housing 102 because the end cap 138, as shown in this example, is welded to the housing 102. Also, the plug 158 and/or the cap screw 126 further prevent unwanted leakage of gas from the second chamber 108 through the piston 104 and the port 122, respectively (e.g., the plug 158 and/or the cap screw 126 provide redundant seals).

Additionally, in this example, although the seal 114 is exposed to both the first and second chambers 106 and 108 of the accumulator apparatus 100, the seal 114 is in a non-stressed condition when the accumulator apparatus 100 is in a stored position (the piston 104 is in the second position). As noted above, when the piston 104 is at the stored position, the pressure of the hydraulic fluid in the first chamber 106 is substantially equal to the pressure of the gas in the second chamber 108, resulting in a substantially zero pressure differential across the seal 114 and the piston 104. As a result, the gas in the second chamber 108 and/or the fluid in the first chamber 106 will typically not migrate, flow, or leak between the first and second chambers 106 and 108. Thus, the example accumulator apparatus 100 provides a tight seal to substantially reduce or prevent pressurized gas from leaking between the second chamber 108 of the housing 102 and the environment or atmosphere, even when the accumulator apparatus 100 is in a stored position and the pressure of the gas is at a relatively high pressure for a relatively long period of time. As a result, the accumulator apparatus 100 substantially reduces maintenance and/or the need to re-charge, thereby significantly reducing costs.

Figure 8A:
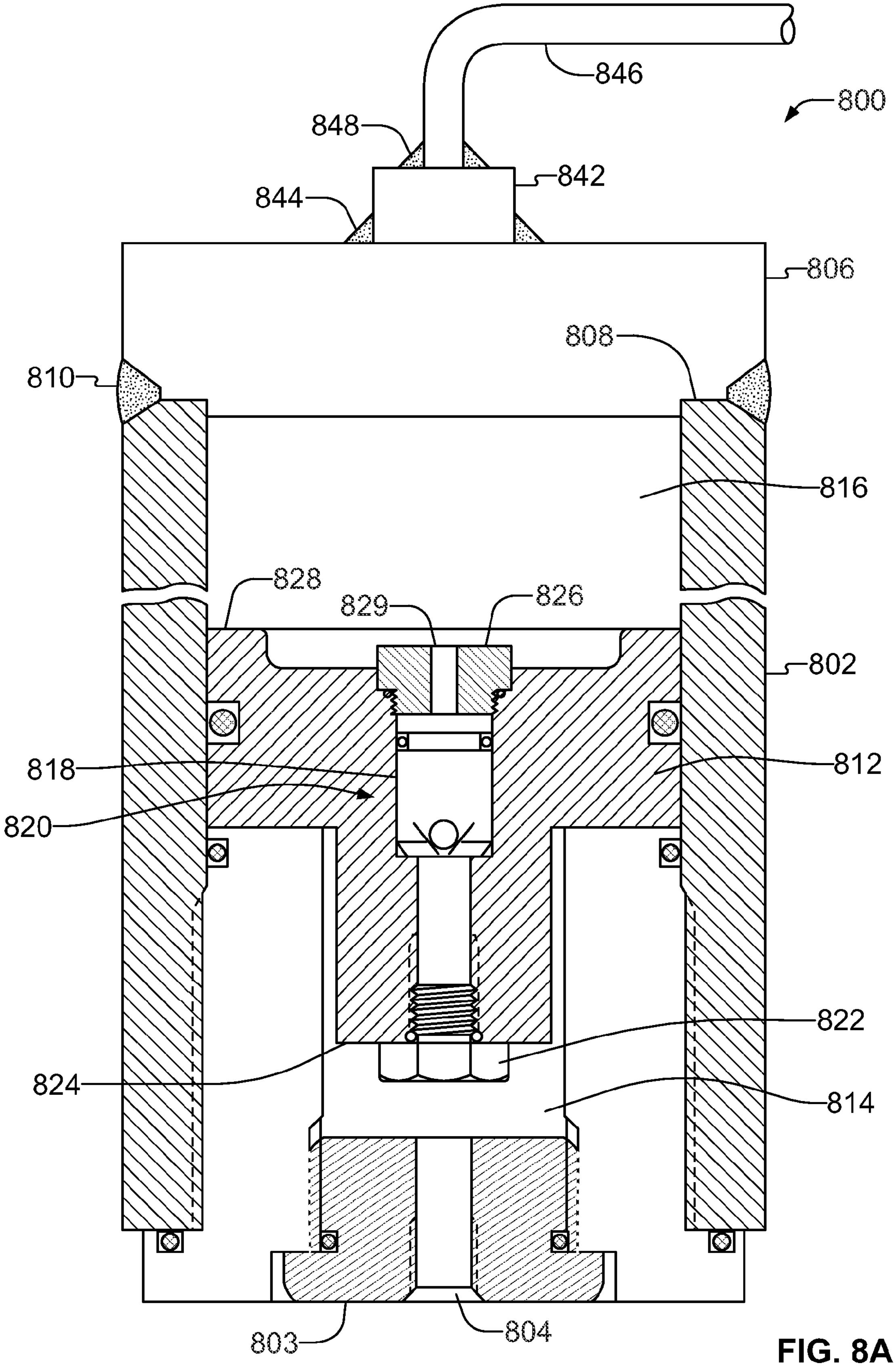
FIG. 8A illustrates another example accumulator apparatus described herein.
Figure 8B:
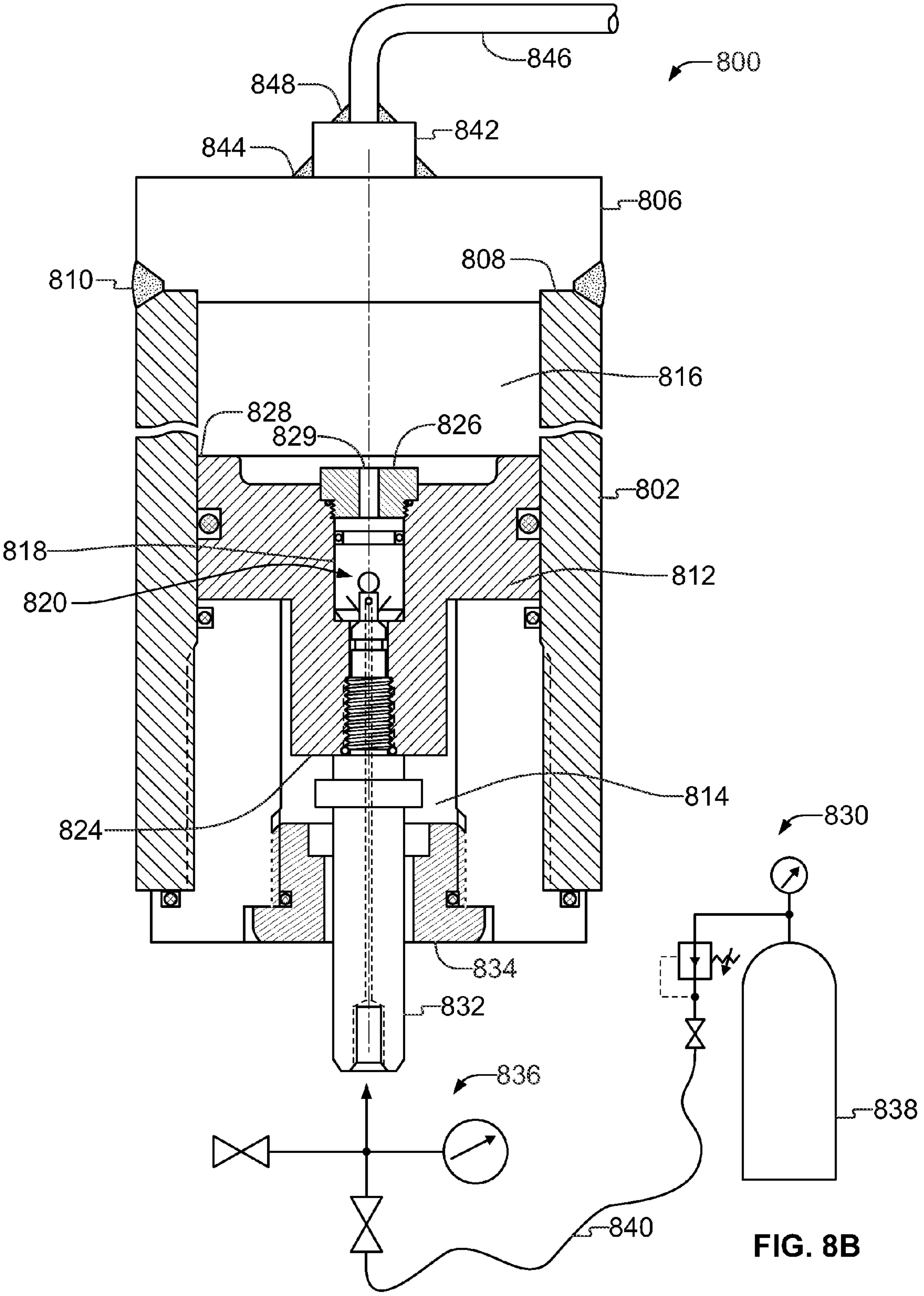
FIG. 8B illustrates another example pre-charge or charging system operatively coupled to the example accumulator apparatus of FIG. 8A.

FIG. 8A illustrates another example accumulator apparatus 800 described herein. FIG. 8B illustrates the example accumulator apparatus of FIG. 8A in a pre-charge or charging condition.

Referring to FIGS. 8A and 8B, in this example, the accumulator apparatus 800 includes a housing 802 having a removable plug 803 defining a port 804 (e.g., a hydraulic fluid port) and an end cap 806 coupled to a second end 808 of the housing 802 via, for example, a welded joint 810. A piston 812 is disposed within the housing 802 to define a first chamber or a hydraulic fluid side 814 of the accumulator apparatus 800 and a second chamber or gas side 816 of the accumulator apparatus 800. In this example, the piston 812 includes an aperture 818 to receive a valve 820 (e.g., a zero leakage check valve). The valve 820 enables gas to flow to the second chamber 816 when the accumulator apparatus 800 is in a pre-charge or charging condition as shown in FIG. 8B and prevents gas flow between the first and second chambers 814 and 816 when the accumulator apparatus 800 is not in a pre-charge or charging condition as shown in FIG. 8A (e.g., during operation). The piston 812 includes a seal plug 822 coupled (e.g., threadably coupled) to a first side 824 of the piston 812 adjacent the first chamber 814 to prevent gas flow and/or hydraulic fluid flow between the first and second chambers 814 and 816 via the valve 820. The piston 812 also includes a plug 826 coupled (e.g., threadably coupled) to a second side 828 of the piston 812 adjacent the second chamber 816. In this example, the plug 826 retains the valve 820 within the aperture 818 of the piston 812 and includes a passage 829 to allow gas flow to the second chamber 816 during a pre-charge or charging operation.

As shown in FIG. 8B, an example pre-charge or charging system 830 is employed to charge the accumulator apparatus 800. In this example, the example charging system 830 includes a fill probe 832, a safety collar 834, a manifold assembly 836, a gas supply source 838 (e.g., a tank), and tubing 840 (e.g., a hose). In this example, the fill probe 832 and the safety collar 834 are differently shaped than the fill probe 202 and safety collar 204 of FIGS. 2-7. The seal plug 822 and the plug 803 are removed from the piston 812 and the housing 802, respectively, during pre-charge and the fill probe 832 and the safety collar 834 are coupled to the piston 812 and the housing 802, respectively.

In the illustrated example, the end cap 806 includes a coupling or connector 842 such as, for example, a socket welded tube connection. As depicted in FIGS. 8A and 8B, the coupling 842 is welded to the end cap 806 via a weld joint 844. Tubing 846 may be coupled to the coupling 842 via, for example, a weld joint 848. The tubing 846 and the coupling 842 fluidly couple the second chamber 816 of the accumulator apparatus 800 to, for example, a gas chamber of another accumulator of the hydraulic system, a gas tank (e.g., a dry nitrogen gas tank), etc. For example, the gas side of a plurality of accumulators of a hydraulic system may be fluidly coupled (e.g., in series) via the coupling 842 and tubing 846. In this manner, for example, during charging, the charging system 830 may only need to be coupled to a first accumulator from a plurality of accumulators to charge the plurality of accumulators with, for example, a dry nitrogen gas. Such a configuration substantially reduces maintenance and costs because the plurality of accumulators of a hydraulic fluid system that are fluidly coupled (e.g., in series) can be pre-charged by coupling the pre-charge system 830 to a first accumulator from the plurality of accumulators.

The example accumulator apparatus 800 and the charging system 830 perform similar functions and/or involve operations and/or functions that are substantially similar to the operations and/or functions of the example accumulator apparatus 100 and the charging system 200 described above. Thus, for brevity, the operation and/or functions of the accumulator apparatus 800 and the charging system 830 will not be repeated. Instead, the interested reader may refer to the description of the operations and/or functions of the accumulator apparatus 100 and the charging system 200 described above in connection with FIGS. 1-7.

Figure 9:
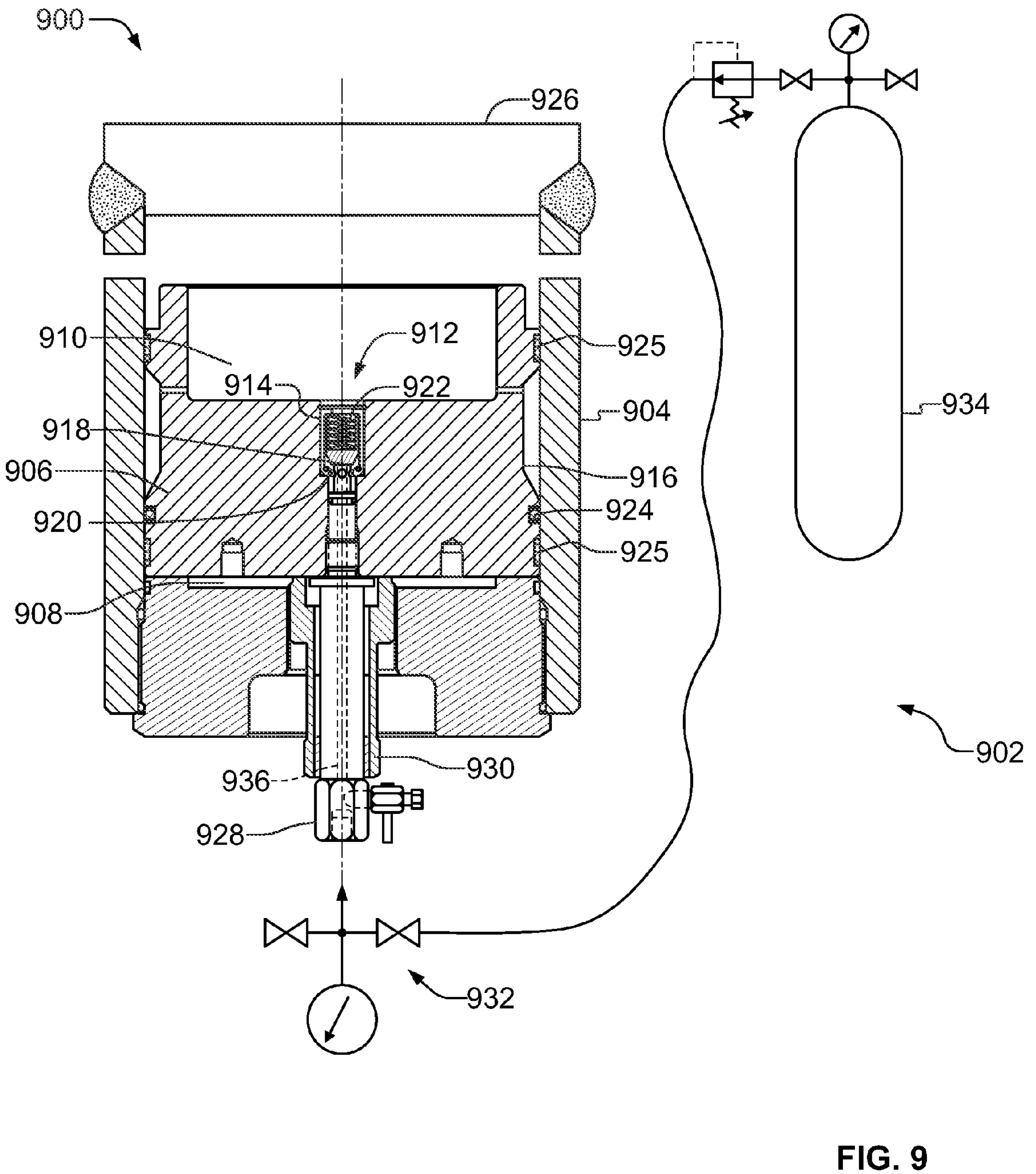
FIG. 9 illustrates yet another accumulator apparatus described herein shown in a pre-charge condition with another example pre-charge or charging system described herein.

FIG. 9 illustrates yet another example accumulator apparatus 900 having another example charging system 902 coupled to the example accumulator apparatus 900. The accumulator apparatus 900 performs functions and/or operations similar to those performed by the example accumulator apparatus 100 of FIGS. 1-7.

In this example, the accumulator apparatus 900 includes a housing 904 having a piston 906 disposed therein to define a first chamber 908 and a second chamber 910. The piston 906 includes a valve 912 disposed within an aperture 914 of a piston body 916. The valve 912 includes a poppet 918 that is biased toward a valve seat 920 via a biasing element 922 (e.g., a spring). Additionally, in this example, the piston 906 includes a seal 924 and piston rings 925 to prevent gas and/or fluid flow between the first and second chambers 908 and 910. In this example, the housing 904 includes an end cap 926 that is coupled to the housing 904 via, for example, welding. However, in other examples, the end cap 926 may be coupled to the housing 904 via any other suitable method or fastening mechanism(s). In yet other examples, the end cap 926 may be integrally formed with the housing 904.

As shown, the charging system 902 includes a fill probe 928, a safety collar 930, a manifold assembly 932, and a gas supply source 934. During pre-charge or charging operations, the fill probe 928 engages the poppet 918 to move the poppet 918 away from the valve seat 920 to allow gas flow between a passage 936 of the fill probe 928 and the second chamber 908. When the fill probe 928 is removed from the piston 906, the biasing element 922 biases the poppet 918 toward the valve seat 920 to prevent gas flow between the first and second chambers 908 and 910 via the valve 912.

The functions, operations, and methods to pre-charge or charge the accumulator apparatus 900 via the charging system 902 are similar to the functions, operations, and methods of pre-charging or charging the example accumulator apparatus 100 via the charging system 200 of FIGS. 1-7. Thus, the functions, operations, and methods of the example accumulator apparatus 900 and the charging system 902 will not be repeated. Instead the interested ready may refer to the functions, operations, and methods of pre-charging or charging the example accumulator apparatus 100 described above in connection with FIGS. 1-7.

Figure 10:
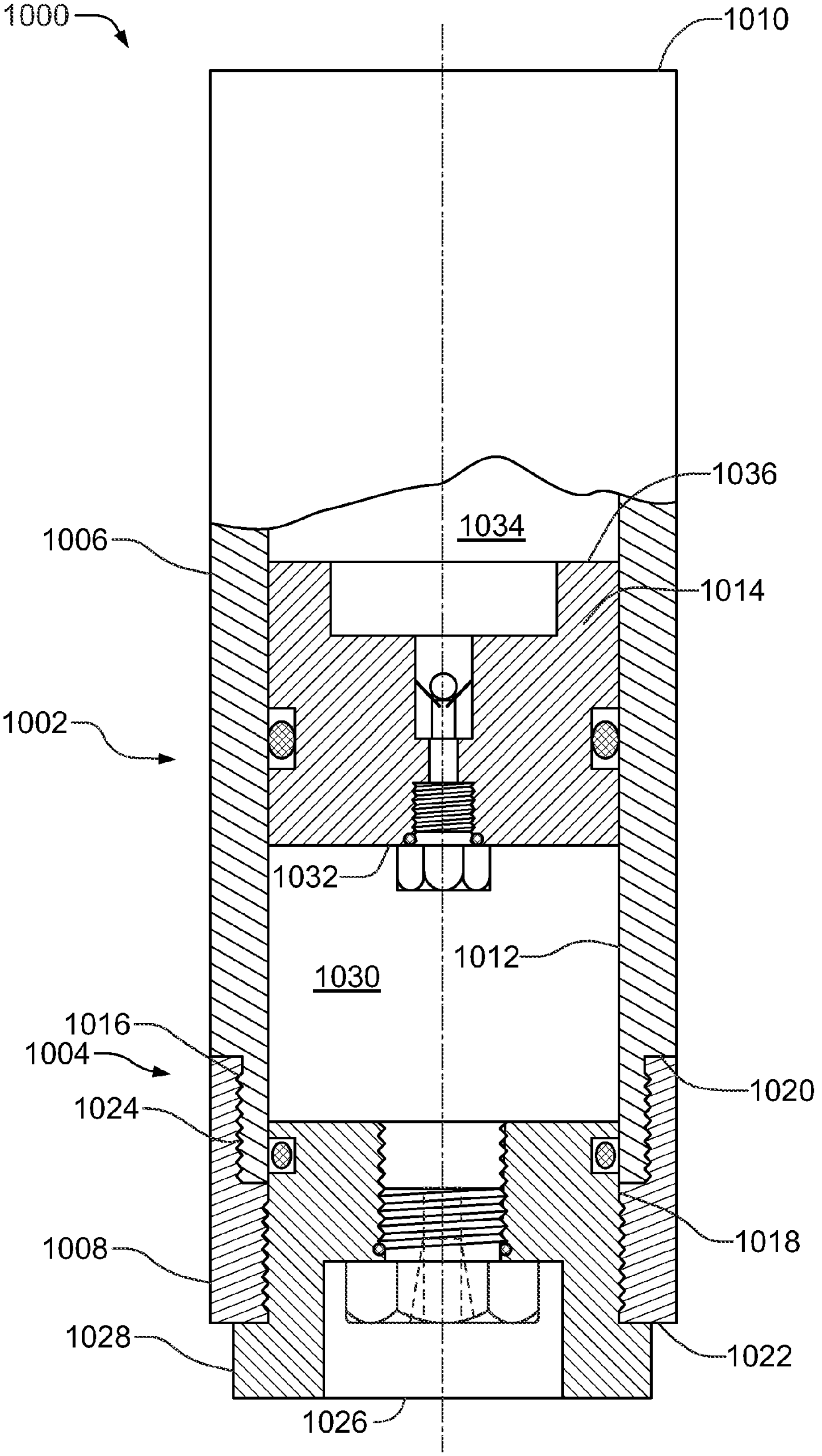
FIG. 10 illustrates yet another example accumulator apparatus described herein.

FIG. 10 illustrates yet another example accumulator apparatus 1000 described herein. The example accumulator apparatus 1000 includes a housing 1002 depicted as a two-piece structure that couples together via a coupling member 1004 such as, for example, threads, fasteners, welding, etc.

In this example, the housing 1002 has a first or upper body 1006 that removably couples to a second or lower body 1008. The upper body 1006 includes an elongated cylindrical body having a closed end 1010 and an open end 1012 (e.g., a bore) to receive a piston 1014. The upper body 1006 includes a threaded portion 1016 adjacent the open end 1012 to threadably couple the upper body 1006 to the lower body 1008. Likewise, the lower body 1008 of the housing includes a cylindrical body having an opening 1018 between a first end 1020 and a second end 1022. The first end 1020 includes a threaded portion 1024 to threadably couple the lower body 1008 to the upper body 1006. Although not shown, a seal (e.g., an O-ring) may be disposed between the threaded portions 1016 and 1024 to prevent leakage of fluid through the threaded portions 1016 and 1024. The second end 1022 receives a hydraulic port 1026 depicted as a removable plug 1028.

When the upper and lower bodies 1006 and 1008 are coupled together, the piston 1014 is disposed therein to define a first chamber 1030 between a first side 1032 of the piston 1014 and the hydraulic port 1026, and a second chamber 1034 between a second side 1036 of the piston 1014 and the closed end 1010 of the upper body 1006 of the housing 1002. The threaded portions 1016 and 1024 of the upper and lower bodies 1006 and 1008 are arranged on the housing 1002 such that the threaded portions 1016 and 1024 are spaced away from and are not exposed to a gas in the second chamber 1034. For example, the threaded portions 1016 and 1024 are not exposed to or do not contact the gas in the second chamber 1034 even when the piston 1014 is in a first position such that the second chamber 1034 has a maximum volume. In this manner, a gas disposed in the second chamber 1034 is tightly sealed within the upper body 1006 of the housing 1002 between the second side 1036 of the piston 1014 and the closed end 1010 of the upper body 1006 (e.g., via seals and/or piston rings coupled to the piston 1014) and prevented from migrating or leaking to the environment.

The example fill probes 202, 832, and 928 and/or the example safety collars 204, 834, and 930 are not limited to the example configurations, shapes and/or sizes depicted in the respective FIGS. 2-7, 8A, 8B, and 9 and may have any other configurations, shapes and/or sizes. Additionally or alternatively, the end caps 138, 806, and 926 may be coupled to the respective housing 102, 802, and 904 via any suitable fastening mechanism(s) that provide a tight seal between the second chamber and the environment.

Although certain example apparatus, methods, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A system to charge an accumulator apparatus, comprising:
- a piston disposed within a housing to define a first chamber adjacent a first side of the piston and a second chamber adjacent a second side of the piston;
- a fill probe having a body and a passageway between a first end of the fill probe and a second end of the fill probe, the fill probe to be removably coupled to the piston to fluidly couple the passageway of the fill probe and the second chamber of the housing when the accumulator apparatus is in a charging condition;
- a valve fluidly coupled to the piston to enable fluid flow to the second chamber of the housing via the piston when the fill probe is coupled to the piston; and
- a safety collar removably coupled to a fluid port adjacent the first chamber, the safety collar having an aperture through which the fill probe extends when the safety collar is coupled to the fluid port.

2. A system of claim 1, wherein the first chamber is to receive an incompressible fluid and the second chamber is to receive a compressible fluid.

3. A system of claim 2, wherein the incompressible fluid comprises a hydraulic fluid and the compressible fluid comprises a gas.

4. A system of claim 3, wherein the gas comprises a dry nitrogen gas.

5. A system of claim 1, wherein the first end of the fill probe includes a threaded portion that threadably couples to a bore in the first side of the piston adjacent the valve and the first chamber.

6. A system of claim 5, wherein the first end of the fill probe includes a tip that engages a poppet of the valve to move the poppet away from a valve seat to allow fluid flow between the passageway of the fill probe and the second chamber when the fill probe is coupled to the piston, and the poppet to sealing engage the valve seat when the fill probe is removed from the bore of the piston.

7. A system of claim 6, wherein the poppet is biased toward the valve seat via a spring.

8. A system of claim 1, wherein the valve is positioned in an opening of the piston.

9. A system of claim 1, wherein the safety collar removably couples to a bore of the fluid port in fluid communication with the first chamber.

10. A system of claim 9, wherein the safety collar includes a shoulder at a first end of the safety collar that is to engage a collar of the fill probe when the fill probe is being removed from the piston.

11. A system to charge an accumulator apparatus comprising:
- a piston disposed in a housing to define a first chamber adjacent a first side of the piston and a second chamber adjacent a second side of the piston;
- a fill probe having a body and a passageway between a first end of the fill probe and a second end of the fill probe, the fill probe to be removably coupled to the piston to fluidly couple the passageway of the fill probe and the second chamber of the housing when the accumulator apparatus is in a charging condition;
- a valve fluidly coupled to the piston to enable fluid flow to the second chamber of the housing via the piston when the fill probe is coupled to the piston; and
- a manifold assembly to fluidly couple a gas supply source to the passageway of the fill probe.

12. A system of claim 11, wherein the manifold assembly includes a first coupling member to matably engage a second coupling member of the fill probe, a block valve to fluidly couple the manifold assembly to the gas supply source, a gauge to measure the pressure of a gas in the second chamber provided by the gas supply source, and a bleed valve.

13. A system to charge an accumulator apparatus comprising:
- a piston disposed within a housing to define a first chamber adjacent a first side of the piston and a second chamber adjacent a second side of the piston;
- a fill probe having a body and a passageway between a first end of the fill probe and a second end of the fill probe, the fill probe to be removably coupled to the piston to fluidly couple the passageway of the fill probe to the second chamber of the housing when the accumulator apparatus is in a charging condition;
- a valve fluidly coupled to the piston to enable fluid flow to the second chamber of the housing via the piston when the fill probe is coupled to the piston;
- an end cap adjacent the second chamber and coupled to the housing; and
- a connector fluidly coupled to the second chamber of the housing via the end cap, the connector to fluidly couple the second chamber of the accumulator apparatus to a third chamber of a second accumulator apparatus.

14. A system of claim 13, wherein the end cap is coupled to the housing via welding.

15. A system of claim 1, wherein the housing comprises a first portion that removably couples to a second portion via threads, the first portion having a closed end and an open end to receive the piston, the first portion and the second side of the piston define the second chamber.

16. A method to charge an accumulator apparatus, the method comprising:
- removing a plug from a bore adjacent a first side of a piston disposed within a housing of the accumulator apparatus;
- coupling a first portion of a fill probe to the bore to engage a valve fluidly coupled to the piston to enable fluid flow through the piston when the accumulator apparatus is in a charging condition;
- fluidly coupling a second portion of the fill probe to a fluid supply source to enable a pressurized fluid from the fluid supply source to flow to a first chamber adjacent a second side of the piston via the fill probe and the valve; and
- removably coupling a safety collar to a fluid port of a second chamber adjacent the first side of the piston, the safety collar having an aperture through which the fill probe extends when the safety collar is coupled to the fluid port.

17. A method of claim 16, further comprising removing a second pressurized fluid from the second chamber of the housing adjacent the first side of the piston prior to removing the plug.

18. A method to charge an accumulator apparatus, the method comprising:

removing a first plug from a first bore adjacent a first side of a piston disposed within a housing of the accumulator apparatus;

coupling a first portion of a fill probe to the first bore to engage a valve fluidly coupled to the piston to enable fluid flow through the piston when the accumulator apparatus is in a charging condition;

fluidly coupling a second portion of the fill probe to a fluid supply source to enable a first pressurized fluid from the fluid supply source to flow to a first chamber adjacent a second side of the piston via the fill probe and the valve;

removing a second pressurized fluid from a second chamber of the housing adjacent the first side of the piston prior to removing the first plug; and removing a second plug from a second bore of a port coupled to the housing adjacent the second chamber prior to removing the first plug from the piston and after removing the second pressurized fluid.

19. A method of claim 18, further comprising coupling a safety collar to the second bore of the port.

20. A method of claim 19, further comprising coupling the second portion of the fill probe to the fluid supply source via a manifold assembly, the manifold assembly including a first coupling member, a block valve, a gauge, and a first bleed valve.

21. A method of claim 20, further comprising moving the block valve of the manifold assembly to an open position to enable fluid flow from the fluid supply source to the second portion of the fill probe during charging, and moving the block valve to a closed position to prevent fluid flow to the second portion of the fill probe when charging of the accumulator apparatus is complete.

22. A method of claim 21, further comprising removing the manifold assembly from the second portion of the fill probe when charging is complete.

23. A method of claim 22, further comprising removing the fill probe from the piston so that a collar of the fill probe engages a shoulder of the safety collar, and wherein removing the fill probe from the piston causes the valve to move to a closed position to prevent fluid flow through the valve.

24. A method of claim 23, further comprising moving a second bleed valve fluidly coupled to the fill probe to an open position to vent trapped pressurized fluid between the first and second portions of the fill probe.

25. A method of claim 24, further comprising removing the fill probe and the safety collar from the accumulator apparatus and coupling the first plug to the first bore of the piston and the second plug to the second bore of the port.

26. A method to charge an accumulator apparatus, the method comprising:

removing a first plug from a first bore adjacent a first side of a piston disposed within a housing of the accumulator apparatus;

coupling a first portion of a fill probe to the first bore to engage a valve fluidly coupled to the piston to enable fluid flow through the piston when the accumulator apparatus is in a charging condition;

fluidly coupling a second portion of the fill probe to a fluid supply source to enable a first pressurized fluid from the fluid supply source to flow to a first chamber adjacent a second side of the piston via the fill probe and the valve; and fluidly coupling a third chamber of a second accumulator apparatus to the first chamber of the accumulator apparatus via a connector coupled to the housing and in fluid communication with the first chamber, the third chamber to receive the first pressurized fluid from the fluid supply source via the first chamber when the second accumulator apparatus is fluidly coupled to the first chamber.

27. A system to charge an accumulator apparatus, comprising:

first means for fluidly coupling a first chamber of an accumulator housing and a gas supply source, the first means for fluidly coupling is to be coupled to a first side of a piston disposed within the housing when the accumulator apparatus in a charging condition, and wherein a second side of the piston, an end cap, and the housing define the first chamber; and second means for fluidly coupling the first chamber and the first means for fluidly coupling via the piston when the first means for fluidly coupling is coupled to the first side of the piston means for preventing inadvertent removal of the first means for fluidly coupling from the accumulator housing during the charging condition, the means for preventing inadvertent removal to receive at least a portion of the first means for fluidly coupling when the first means for fluidly coupling and the means for preventing inadvertent removal are coupled to the housing.

28. A system of claim 27, wherein the first means for fluidly coupling comprises means for moving the second means for fluidly coupling to an open position to allow gas flow therethrough when the first means for fluidly coupling is coupled to the first side of the piston.

29. A system of claim 28, wherein a first portion of the first means for fluidly coupling having first means for removably coupling to a bore formed at a first side of the piston adjacent a second chamber and a second portion of the first means for fluidly coupling having second means for removably coupling to the gas supply source.

30. A system of claim 27, wherein the second means for fluidly coupling is positioned in an aperture of the piston, and an inlet of the second means for fluidly coupling is adjacent the first side of the piston and the second chamber and an outlet of the second means for fluidly coupling is adjacent the second side of the piston and the first chamber.

31. An accumulator apparatus, comprising:

a piston disposed within a housing to at least partially define a first chamber adjacent a first side of the piston and a second chamber adjacent a second side of the piston;

a valve fluidly coupled to the piston that moves between an open position to enable fluid flow through the piston when the accumulator apparatus is in a charging condition and a closed position to prevent fluid flow through the piston when the accumulator apparatus is not in the charging condition;

a plug removably coupled to the piston between the valve and the first chamber of the housing; and a second plug removably coupled to the housing adjacent the first chamber and the first plug.

32. An apparatus of claim 31, wherein the valve is disposed within an aperture of the piston.

33. An apparatus as described in claim 31, wherein the piston includes a bore adjacent the first side of the piston to receive the first plug, the first plug and the second plug are removed from the bore when the accumulator apparatus is in the charging condition.

34. An apparatus as described in claim 31, wherein the valve comprises a poppet that sealingly engages a valve seat to prevent fluid flow through the piston when the accumulator apparatus is not in the charging condition.

35. An apparatus as described in claim 34, wherein the poppet is biased toward the valve seat via a spring.

36. An apparatus as described in claim 31, wherein the first chamber is to receive an incompressible fluid and the second chamber is to receive a compressible fluid.

37. A method of claim 16, further comprising removing the fill probe from the piston so that a collar of the fill probe engages a shoulder of the safety collar, and removing the fill probe from the piston causes the valve to move to a closed position to prevent fluid flow through the valve.

* * * * *